C. La DOW.
HARROW CULTIVATOR.
No. 187,392.  Patented Feb. 13, 1877.
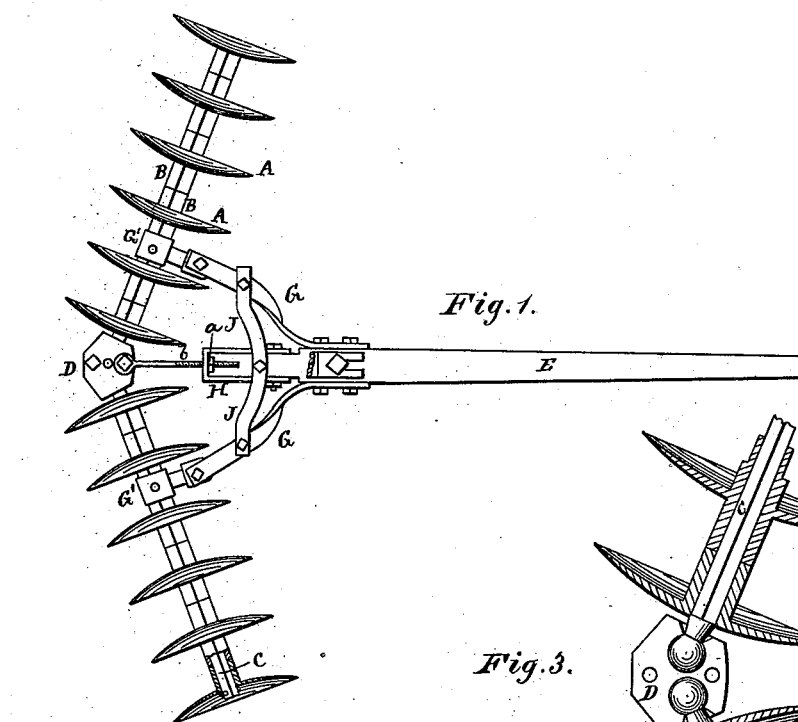
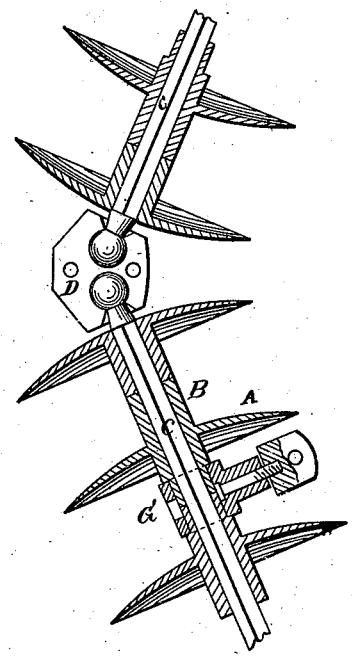
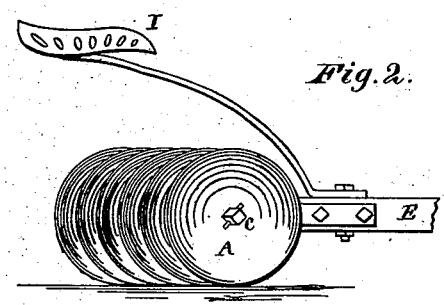
WITNESSES
INVENTOR
Chas. La Dow
ATTORNEYS

UNITED STATES PATENT OFFICE.

CHARLES LA DOW, OF ALBANY, NEW YORK.

IMPROVEMENT IN HARROW-CULTIVATORS.

Specification forming part of Letters Patent No. 187,392, dated February 13, 1877; application filed December 13, 1876.

*To all whom it may concern:*

Be it known that I, CHARLES LA DOW, of Albany, in the county of Albany, and in the State of New York, have invented certain new and useful Improvements in Harrow-Cultivators; and do hereby declare that the following is a full, clear, and exact description thereof, reference being had to the accompanying drawings, and to the letters of reference marked thereon, making a part of this specification.

The nature of my invention consists in the construction and arrangement of a pulverizing harrow-cultivator, as will be hereinafter more fully set forth.

In order to enable others skilled in the art to which my invention appertains to make and use the same, I will now proceed to describe its construction and operation, referring to the annexed drawing, in which—

Figure 1 is a plan view of my improved harrow-cultivator. Fig. 2 is a side view of the same. Fig. 3 is an enlarged section of a part thereof.

A A represent a series of concavo-convex disk-wheels provided with hollow center hubs or bosses B B, so formed as to admit of being mounted upon axles or shafts C C, having corners or irregular surfaces, so that the wheels must revolve uniformly and also turn with the shafts without being clamped thereto. The axles or shafts C C, upon which the disks A A are mounted, are connected at their inner ends by a universal joint-coupling, D, which enables the center of the harrow to conform to uneven surfaces, and also admits of the center coupling being drawn forward or rearward when the operator wishes to change the angle of the disks relatively to the line of draft. The disks or wheels are kept at uniform distances apart on their axles by their hubs or bosses B B, which are of suitable length, and the outer wheel on each shaft is secured by a pin, key, or nut.

E represents the pole, which has two draft-bars, G G, affixed thereto. These draft-bars diverge and extend rearward to the disk-shafts C C, to which they are connected by universal joint-couplings, G' G', serving as boxes and pivots for said shafts, while the inner ends of the shafts are kept in place and drawn by their connections with the pole. This connection is formed of a stirrup, H, adjustably pivoted to and extending rearward from the rear end of the pole E. A rod, b, is pivoted on the center coupling D, and passed through the end of the stirrup, and a nut, a, is screwed on the end of the rod. By this means the wheel-gangs are or may be drawn forward by the center coupling D, or by the couplings G' G'. The center coupling, being variable and self-acting, compels all the wheels to cut the soil to a uniform depth when the pole is suddenly raised or lowered by the horses passing uneven ground.

The axles C C may be set at any desired angle to the line of draft by tightening or loosening the nut a on the central draft-rod b, and the inner ends of the axles are carried and worked on a line back of their outer ends, thus bringing the cutting-edges of the inner disks nearer together, or, in other words, the central disks are brought to, or nearly to, a cutting-edge at the center of the harrow.

The pole E is provided with a seat, I, for the driver, whose weight is made to bear upon the center of each shaft, by means of the draft-bars G G, and the braces J J connecting them with the pole and keeping them from bending.

Having thus fully described my invention, what I claim as new, and desire to secure by Letters Patent, is—

1. In a harrow-cultivator, the disk-gangs, connected at their inner ends by a universal joint, as herein described.

2. The combination, in a harrow-cultivator, of two disk-shafts, connected at their inner ends by a universal joint, and adjustable relatively to the line of draft.

3. The combination of the draft-bars G, boxes G', braces J, pole E, and seat I, with the flexibly-jointed axles C C and wheels A of a harrow-cultivator, as and for the purposes herein set forth.

4. The combination of the draft-bars G G and universal joints G' G' with the axles C C and the center joint D connecting the axles, and adjustably connected to the rear end of the pole, for the purposes herein set forth.

5. The combination of the axles C C, universal joints G' G', braces G G, and universal center joint D, with the pivoted rod b, adjustably pivoted stirrup H, pole E, and nut a, substantially as and for the purposes herein set forth.

In testimony that I claim the foregoing I have hereunto set my hand and seal this 22d day of November, 1876.

CHARLES LA DOW. [L. S.]

Witnesses:
C. L. EVERT,
EUGENE BURLINGAME.